United States Patent [19]
Karidis et al.

[11] Patent Number: 5,793,607
[45] Date of Patent: Aug. 11, 1998

[54] EJECTION MECHANISM FOR PC CARDS

[75] Inventors: John Peter Karidis, Ossining; Gerard McVicker, Wappingers Falls, both of N.Y.

[73] Assignee: International Business Machines Corporation, Armonk, N.Y.

[21] Appl. No.: 703,611

[22] Filed: Aug. 27, 1996

Related U.S. Application Data

[60] Provisional application No. 60/008,091, Oct. 30, 1995.

[51] Int. Cl.$^6$ ................ G06F 1/16; H05K 7/10
[52] U.S. Cl. .......... 361/684; 361/726; 361/754; 361/798; 361/685; 439/160
[58] Field of Search ............ 361/684–686, 361/726, 727, 732, 740, 754, 798, 801; 360/97.03, 98.01, 137 D; 439/152–160, 928.1; 364/708.1; G06F 1/16

[56] References Cited

U.S. PATENT DOCUMENTS

| | | | |
|---|---|---|---|
| 4,547,835 | 10/1985 | Pansaerts et al. | 361/759 |
| 5,115,376 | 5/1992 | Nakajima | 361/684 |
| 5,197,894 | 3/1993 | Koike | 439/159 |
| 5,299,089 | 3/1994 | Lwee | 361/684 |
| 5,305,180 | 4/1994 | Mitchell et al. | 361/685 |
| 5,470,241 | 11/1995 | Kaufman et al. | 439/159 |
| 5,483,419 | 1/1996 | Kaczeus, Sr. et al. | 361/685 |
| 5,492,480 | 2/1996 | Fusselman et al. | 439/157 |
| 5,597,316 | 1/1997 | David et al. | 439/159 |
| 5,600,539 | 2/1997 | Heys, Jr. et al. | 361/684 |
| 5,622,510 | 4/1997 | Ishida | 439/160 |
| 5,643,001 | 7/1997 | Kaufman et al. | 439/159 |
| 5,655,918 | 8/1997 | Soh | 439/159 |

*Primary Examiner*—Lynn D. Feild
*Attorney, Agent, or Firm*—Heslin & Rothenberg, P.C.; Wayne F. Reinke, Esq.

[57] ABSTRACT

A PC Card ejection mechanism includes a common selector for selecting a PC Card for ejection. The common selector may also be capable of selecting a holding position for holding the PC Cards in place. The common selector is coupled to a spring-loaded shaft with a radial extension at the other end. The radial extension engages a pivoting actuator arm which pushes the PC Card out of the PC Card stack. In the holding position, the common selector engages a flap that holds the PC Cards in place. Optionally, the ejection mechanism could include a solenoid and electrically activated pin holding an extension on the shaft to prevent movement of the shaft, thereby locking it. The ejection mechanism alone or in conjunction with a locking mechanism can also be used to hold and/or lock and unlock a removable disk drive.

17 Claims, 10 Drawing Sheets

EJECTION MECHANISM FOR PC CARDS

This application claims the benefit of U.S. Provisional application Ser. No. 60/008.091, filed Oct. 30, 1995.

BACKGROUND OF THE INVENTION

Technical Field

The present invention generally relates to ejection mechanisms for PCMCIA Cards (or PC Cards). More particularly, the present invention relates to centralized or common selection, ejection and locking of PC Cards from a stack of PC Cards.

Background Information

In the past, PCMCIA (Personal Computer Memory Card International Association) card ejection mechanisms have included individual eject buttons for each PC Card. These buttons tend to be small and recessed, internal to the product covers. Such awkward placement has made it difficult to use one's finger to actuate the ejection mechanism.

In addition, PC Cards have heretofore not been protected from unintentional removal or theft. A PC Card lock would therefore be useful in reducing unwanted removal and/or deterring theft of PC Cards.

Thus, a need exists for a PC Card ejection mechanism with improved ergonomics such that a user's finger is able to actuate the ejection mechanism, and a lock to reduce unintentional removal and/or deter theft.

SUMMARY OF THE INVENTION

Briefly, the present invention satisfies the need for a PC Card ejection mechanism with improved ergonomics and security by providing a larger common selector for selecting the PC Card for ejection, and a lock for the ejection mechanism or common selector.

In accordance with the above, it is an object of the present invention to provide an improved PC Card ejection mechanism.

It is a further object of the present invention to provide a PC Card ejection mechanism with a common selector for selecting the PC Card for ejection.

It is still another object of the present invention to provide a PC Card ejection mechanism with a locking feature.

The present invention provides apparatus for selecting and ejecting a PC Card from a stack of PC Cards. The apparatus comprises a common selector for selecting a PC Card from the stack for ejection, and means coupled to the common selector for ejecting the selected PC Card. The common selector may assume a parked position for holding the PC Cards in place. In addition, the apparatus may include a lock for locking the apparatus.

These, and other objects, features and advantages of this invention will become apparent from the following detailed description of the various aspects of the invention taken in conjunction with the accompanying drawings.

BEST MODE FOR CARRYING OUT THE INVENTION

Figure 1:
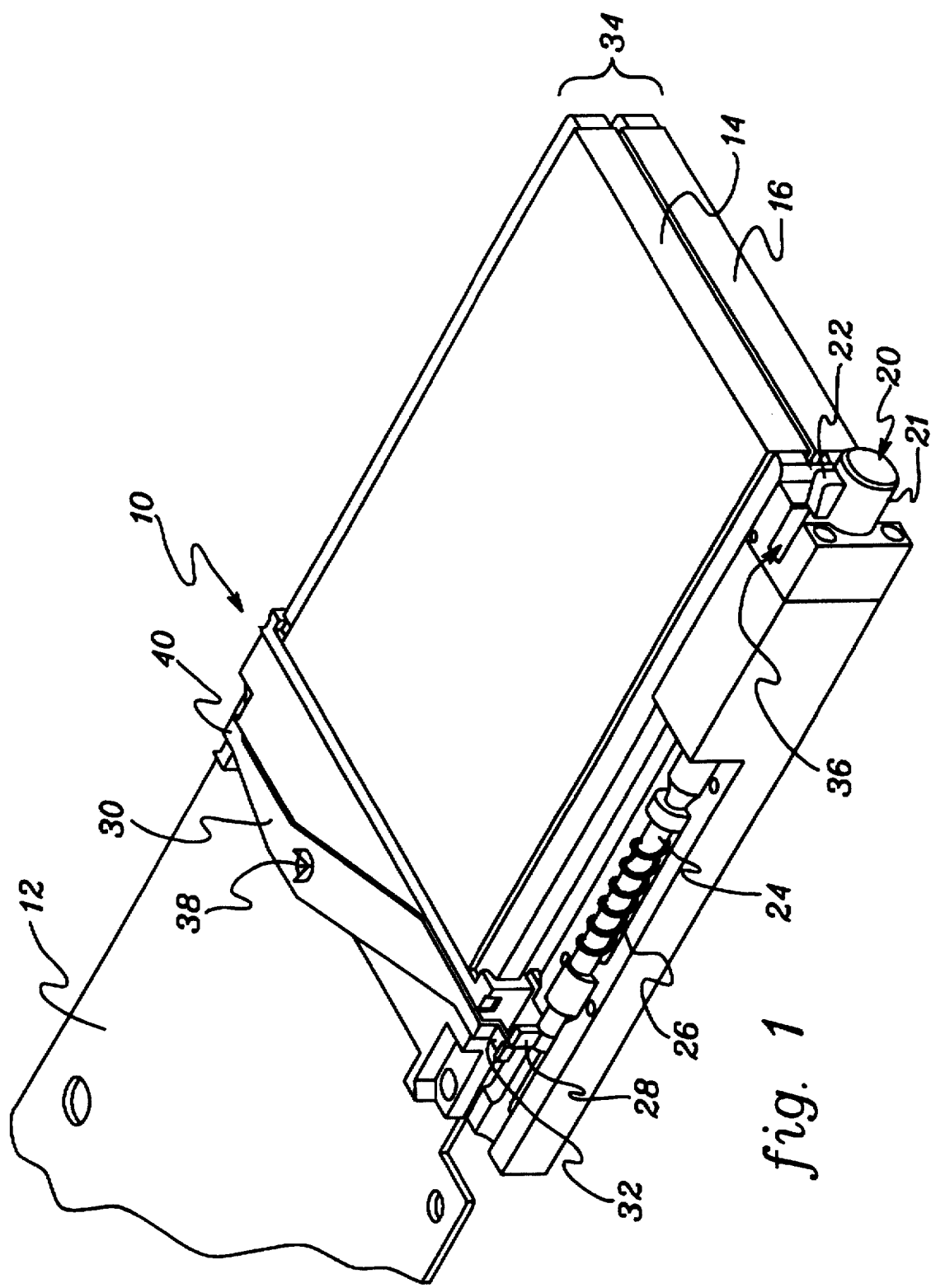
FIG. 1 depicts a PC Card ejection mechanism in accordance with the present invention.

FIG. 1 depicts a PC Card chassis 10 connected to a printed circuit board 12, with the chassis cover (see FIG. 2) removed. Chassis 10 holds PC Cards 14 and 16. Housed within housing 11 is ejection mechanism 18. Ejection mechanism 18 comprises a common selector 20, shaft 24 connected to common selector 20, spring 26 surrounding shaft 24, radial extension 28 connected to shaft 24, and pivoting actuator arm 30 with arm extension 32. In the present embodiment, common selector 20 comprises a rotatable spring-loaded knob 21 with radial extension 22.

As referred to herein, the term "PC Card" is a general term for many different types of computer peripheral devices having the appearance of a card. Some examples of such peripherals include a modem card, a memory card, a small hard disk drive, a radio card (which could be, e.g., the inner workings of a cellular phone), a LAN attachment, an SCSI interconnect, a video capture card, a sound card or a card with multiple functions thereon. The term "PC Card" includes what has been called in the past "PCMCIA Cards".

Figure 2:
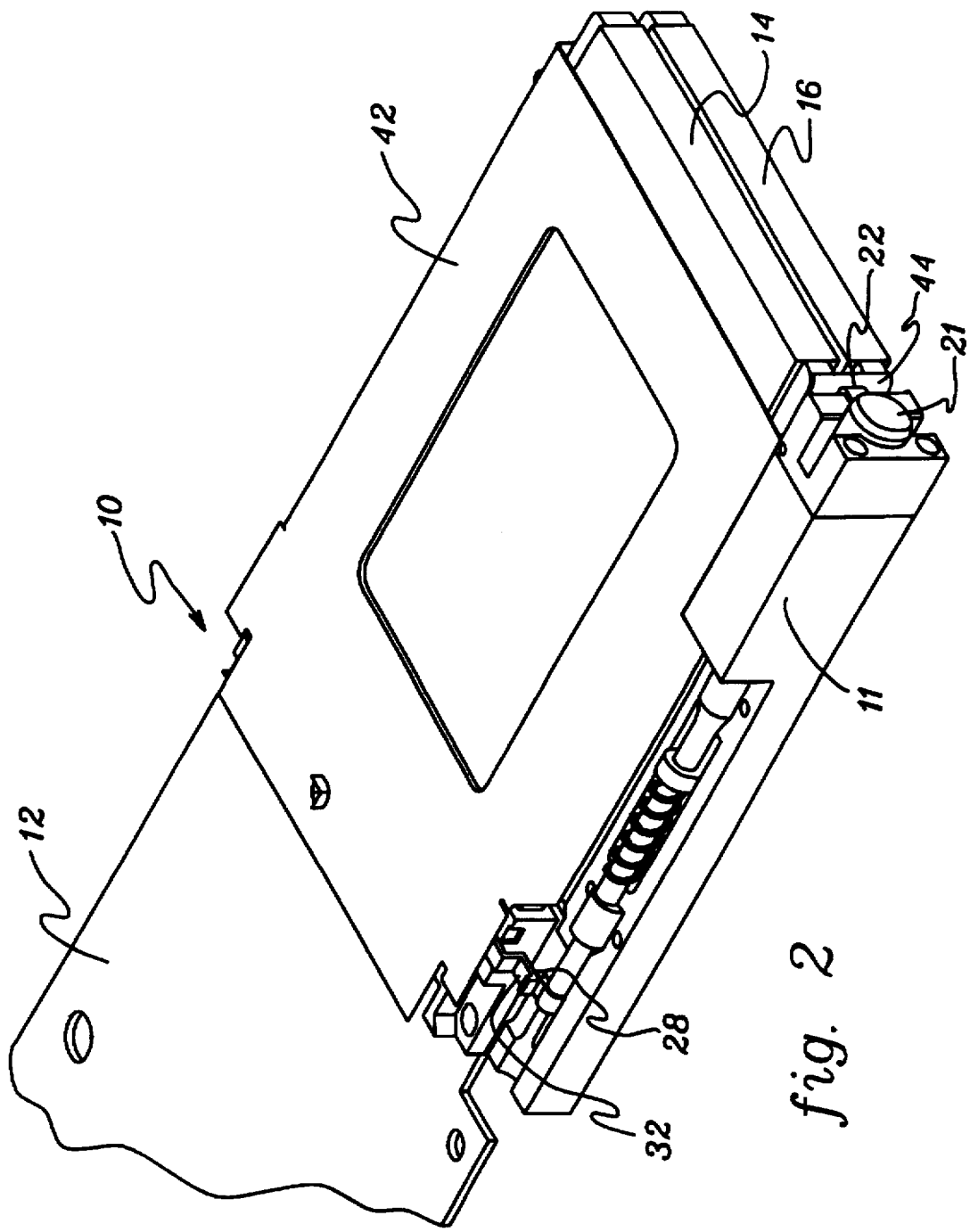
FIG. 2 depicts the apparatus of FIG. 1 with a cover over the chassis holding the PC Cards, and with the PC Card common selector in the lock position.
Figure 3:
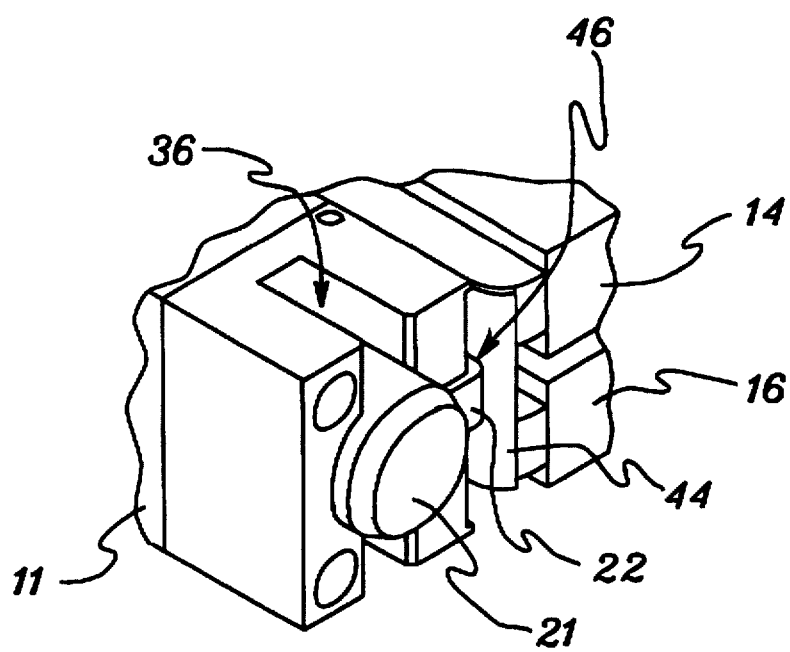
FIG. 3 depicts the common selector of FIG. 2 from a different angle.

PC Cards have heretofore been known as Type I, Type II or Type III cards. The card type indicates the thickness thereof, with higher numbers indicating a thicker card. FIGS. 1, 2 and 3 depict two Type II PC Cards. Chassis 10 could hold, for example, two Type I cards instead two Type II PC Cards, or one Type III in the bottom slot where PC Card 16 resides. In addition, so long as chassis cover 42 remains removed, a Type III card could be placed in the slot for PC Card 14, while the slot for PC Card 16 could hold a Type I or Type II PC Card.

The operation of ejection mechanism 18 will now be described in detail. One skilled in the art will be familiar with PC Cards. As depicted in FIG. 1, ejection mechanism 18 is poised to eject PC Card 14. Although common selector 20 is herein described as a rotatable spring-loaded knob with radial extension, it will be understood that common selector 20 could take any form, so long as the purpose of selecting a PC Card for ejection from a stack of PC Cards (e.g., stack 34) is realized. In the embodiment of FIG. 1, knob 21 could also be rotated 180°, such that radial extension 22 pointed downward. As knob 21 (shown in an outward position) is pushed in, slot 36 in housing 11 accepts and guides radial extension 22 to the end thereof. Shaft 24, connected to common selector 20, is also pushed in the same direction under tension, due to spring 26. Radial extension 28 connected to shaft 24 at the end opposite common selector 20 engages arm extension 32 on pivoting actuator arm 30 such that arm 30 pivots at pivot point 38 to cause ejection end 40 thereof to push PC Card 14 out of stack 34 in a direction away from printed circuit board 12. After PC Card 14 has been ejected and a user's finger (not shown) is removed from knob 21, shaft 24 and common selector 20 preferably resume the position shown in FIG. 1 (i.e. they pop back out).

It will be understood that another pivoting actuator arm (not shown) is included on the bottom side of chassis 10 such that if knob 21 was rotated 180° and pushed in, PC Card 16 would be ejected instead. Further, another slot similar to slot 36 exists on the opposite side of housing 11 to serve a similar purpose as slot 36 (see FIG. 3).

FIG. 2 depicts the chassis 10 and printed circuit board 12 of FIG. 1 with a cover 42 covering arm 30 and PC Cards 14 and 16. In addition, common selector 20 is in a parked position such that radial extension 28 fits under and does not engage arm extension 32. As knob 21 (shown in an inward position) is pushed in, radial extension 22 engages a movable flap 44 for preventing ejection of PC Cards 14 or 16 from chassis 10.

FIG. 3 is a close-up view of the elements surrounding common selector 20 from FIG. 2. As shown in FIG. 3, a slot 46 in housing 11 accepts radial extension 22 of common selector 20. Flap 44 is shown slightly curved, such that the angle of radial extension 22 (shown best in FIG. 1) gradually engages flap 44 to attain the parked position. Flap 44 provides a mechanism to hold the PC Cards in place and help prevent unintentional PC Card removal. Preferably, knob 21 remains in an inward position until pushed in again to release same, much like a ballpoint pen.

Figure 10:
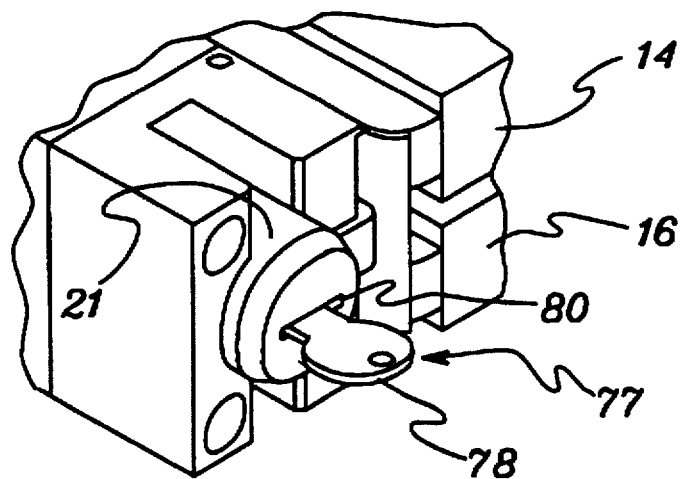
FIG. 10 depicts a mechanical lock as one alternative to the electronic lock of FIG. 4.

FIG. 10 depicts the apparatus of FIG. 3 with an optional mechanical lock 77 for knob 21 of the ejection mechanism. Mechanical lock 77 comprises a key 78 fitting into and turnable in key hole 80, however, other known mechanical locks could instead be used. The purpose of the mechanical lock is to hold knob 21 in the parked position, thereby locking PC Cards 14 and 16 in place.

It will be understood that the particular embodiment of common selector 20 depicted in FIGS. 1, 2 and 3 is exemplary, and could take other forms. For example, the common selector could be a slidable knob shifted vertically (verses rotating) in order to select a PC Card for ejection or choose the parked position.

Figure 4:
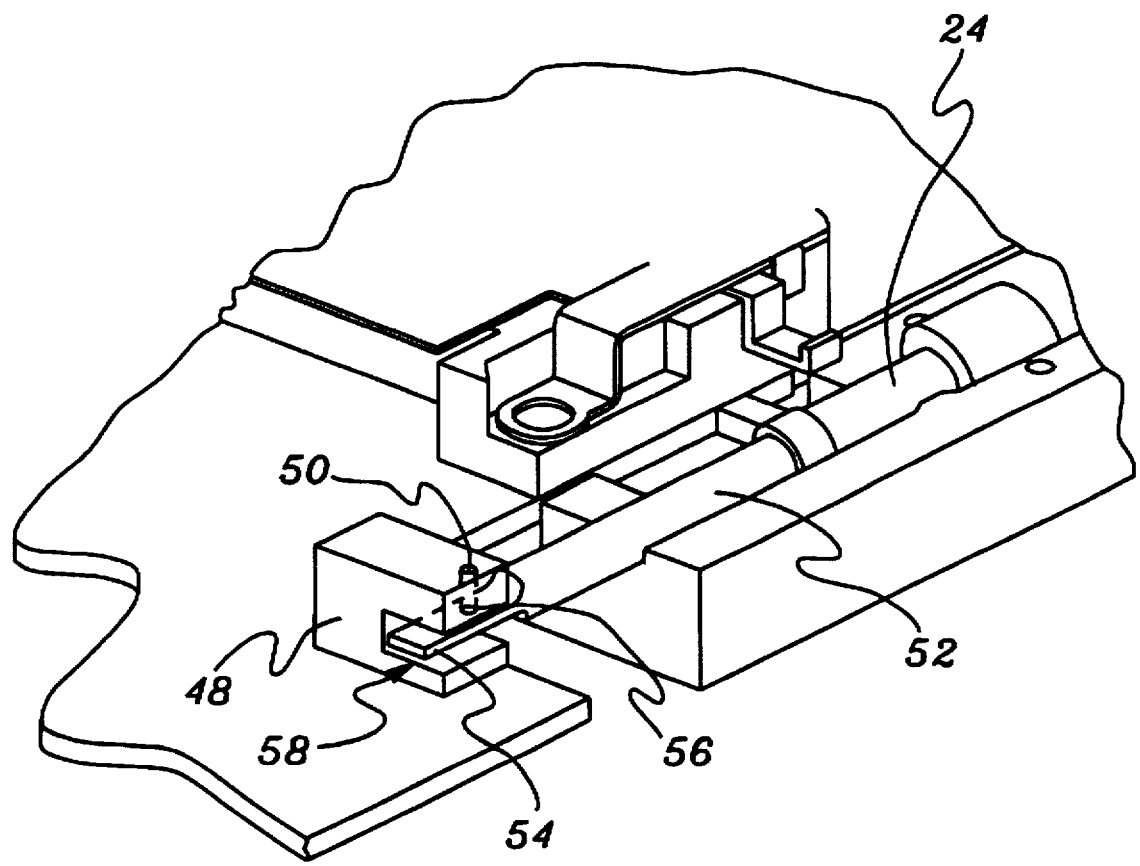
FIG. 4 depicts an optional electronic lock usable with the ejection mechanism of FIG. 1.
Figure 5:
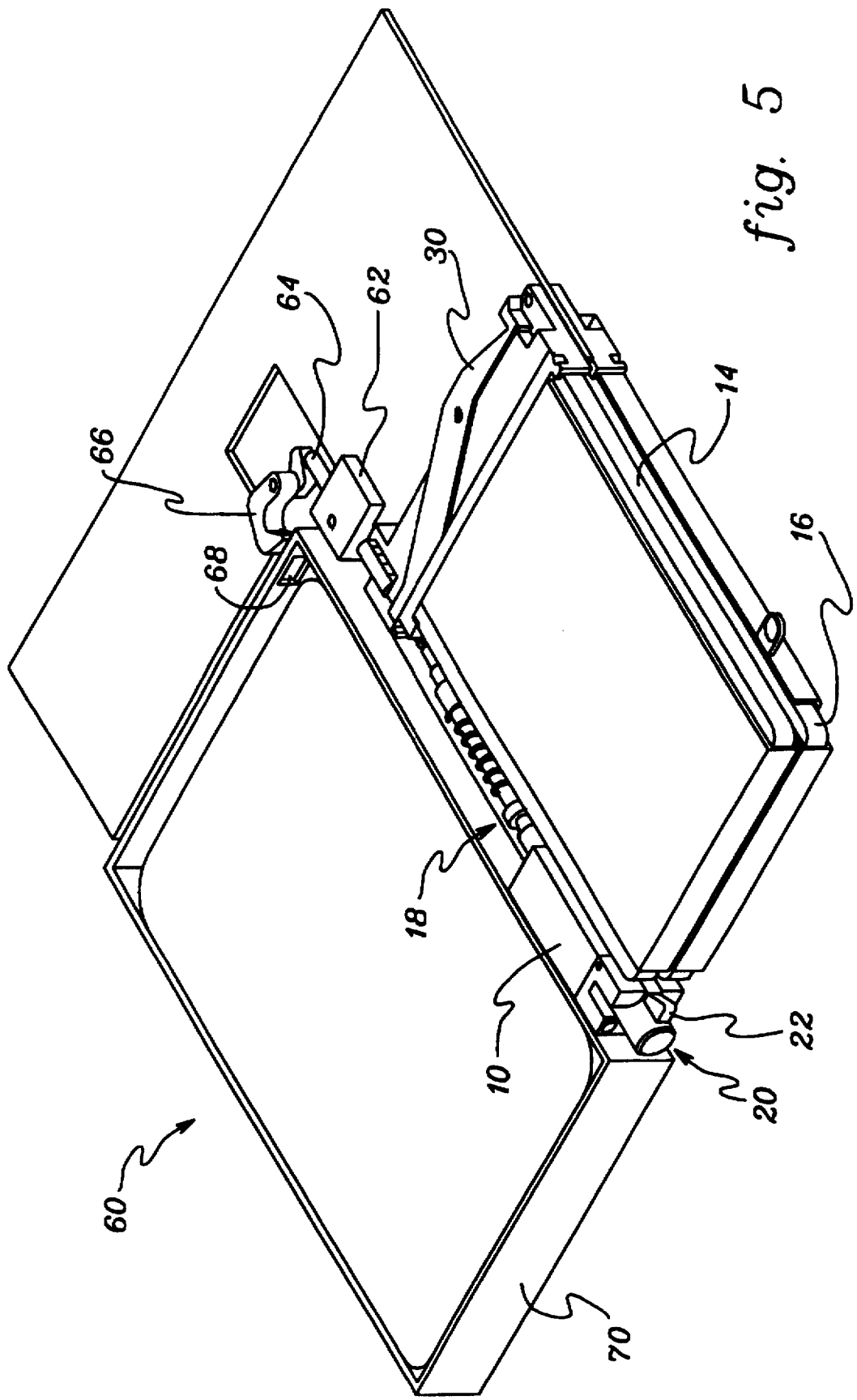
FIG. 5 depicts the ejection mechanism of FIG. 1 used with a removable hard disk drive.
Figure 9:
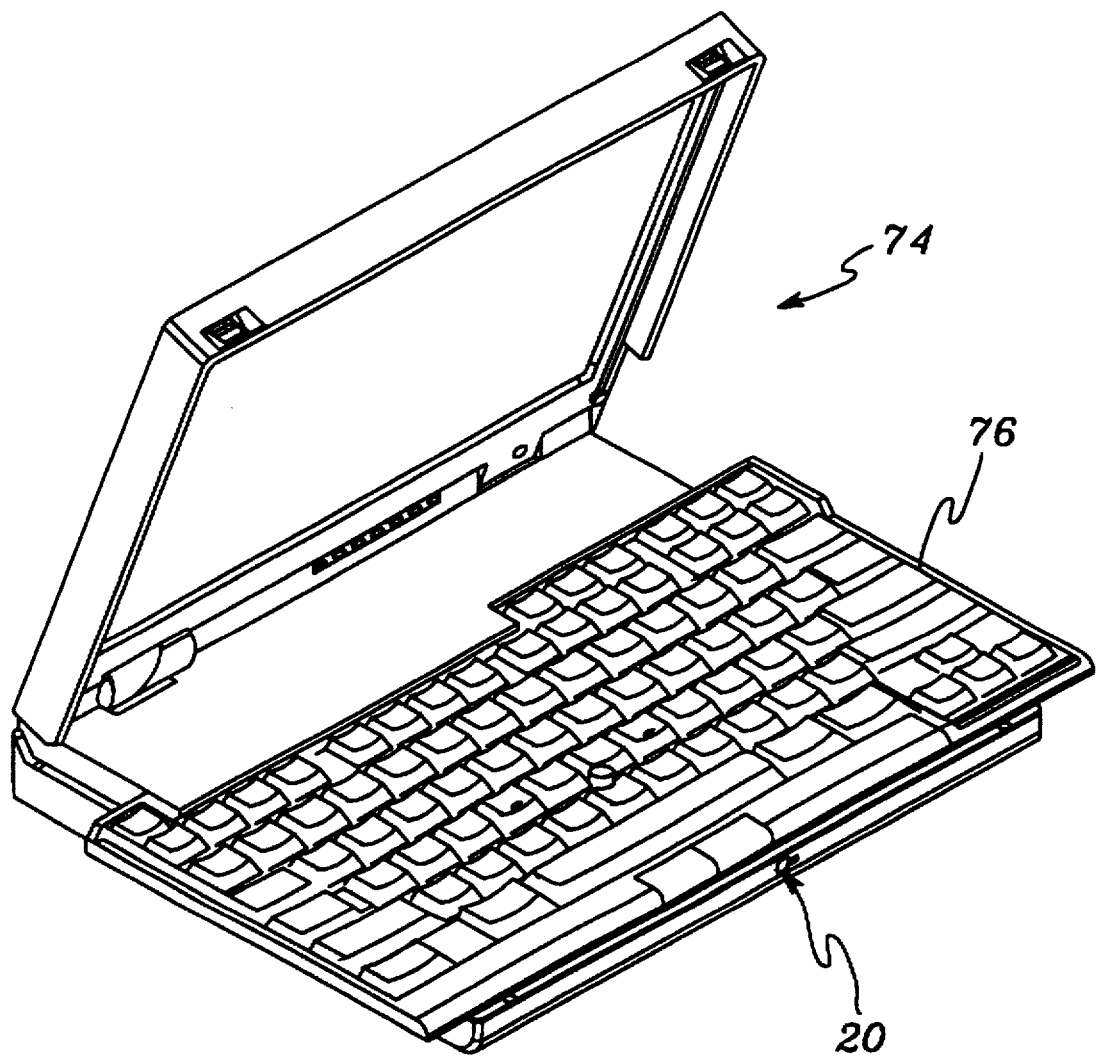
FIG. 9 depicts a notebook computer housing the apparatus of FIG. 5.

FIG. 4 depicts an optional electrical lock for ejection mechanism 18. Shown in FIG. 4 is solenoid 48, electrically activated pin 50, and shaft extension 52 connected to shaft 24. Shaft extension 52 includes a flattened end 54 having a slot 56 therein for receiving electrically activated pin 50. As flattened end 54 turns within open area 58 of solenoid 48, slot 56 aligns with pin 50 such that pin 50 may be inserted therein, thereby preventing shaft 24 from rotating or translating. The solenoid could be activated and/or deactivated by the selector, or it could be operated by means other than the selector. For example, assume the apparatus of FIG. 5 is housed within notebook computer 74 depicted in FIG. 9. Operation of the solenoid (or other electronic lock) could be controlled by keystrokes on keyboard 76. As another example, closure of notebook computer 74 could activate the solenoid, and entry of a password via keystrokes could deactivate the solenoid. Of course, a mechanical lock like that described with respect to FIG. 10 is an alternative to an electronic lock. Preventing operation of the solenoid (i.e., activating the lock) increases security and deters theft, as well as reduces unintentional removal.

FIG. 5 depicts the apparatus of FIG. 1 along with a removable hard disk drive 60. In this aspect of the invention, the ejection mechanism works alone or in conjunction with a means for holding removable hard disk drive 60 to effect holding of the disk drive in place. Holding the disk drive in place makes removal thereof more difficult.

A means for holding removable hard disk drive 60 comprises solenoid 62, actuating pin 64 (an extension of shaft extension 52), spring-loaded latch 66 and an opening 68 in disk drive chassis 70. When common selector 20 is placed in the parked position (see FIG. 6), actuating pin 64 pushes on spring-loaded latch 66 such that the latch catches opening 68. When common selector 20 is removed from the parked position, actuating pin 64 is pulled in the opposite direction, allowing spring-loaded latch 66 to exit opening 68. In this way, common selector 20 can be used to hold removable hard disk drive 60 in place. Solenoid 62 operates similarly to that described with regard to FIG. 4.

Figure 6:
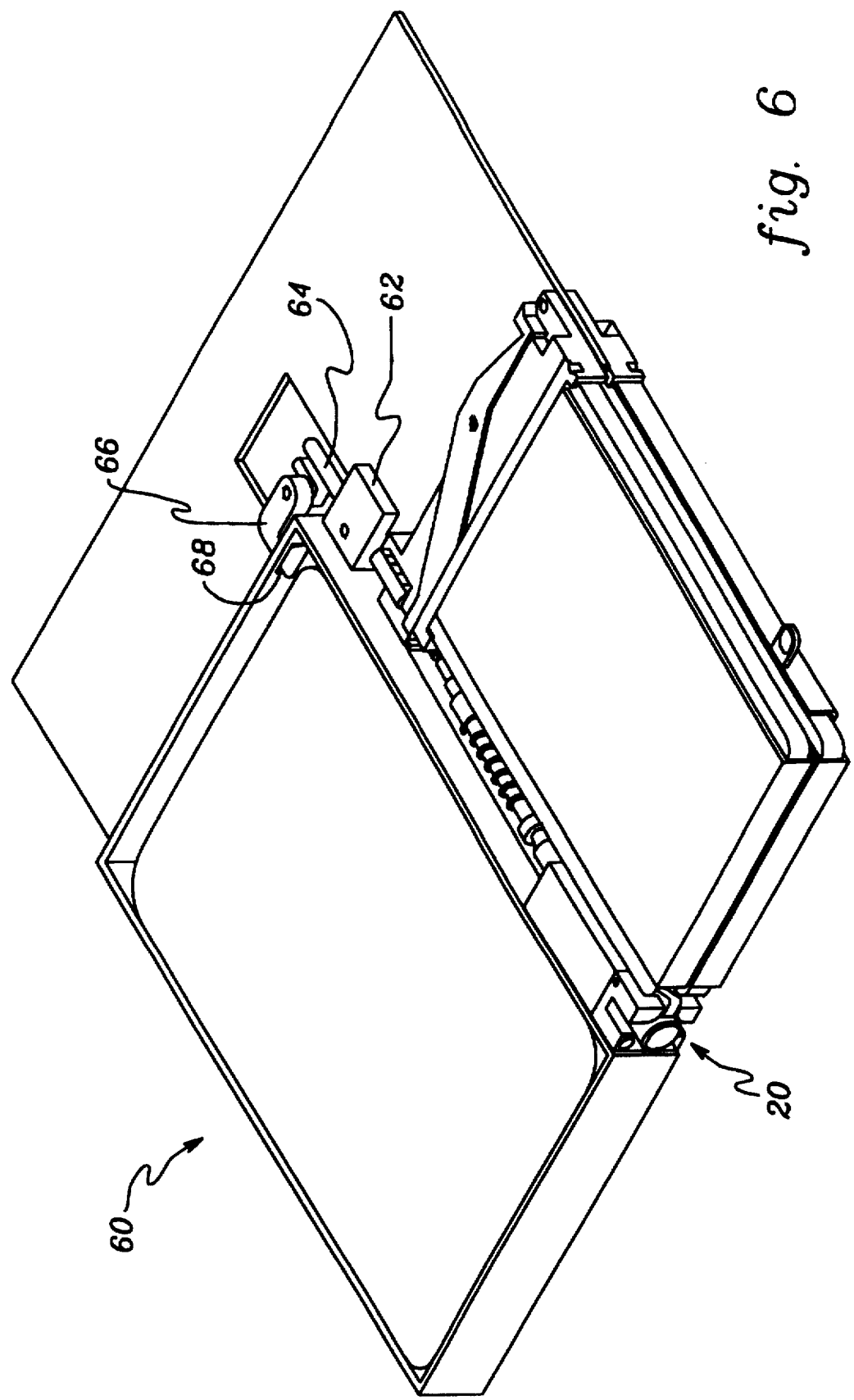
FIG. 6 depicts the apparatus of FIG. 5 with the removable hard disk drive in the locked position.

FIG. 6 depicts the apparatus of FIG. 5 with common selector 20 in the parked position. Actuating pin 64 is shown in the extended position and forcing spring-loaded latch 66 to enter opening 68, thereby holding disk drive 60 in place.

Figure 7:
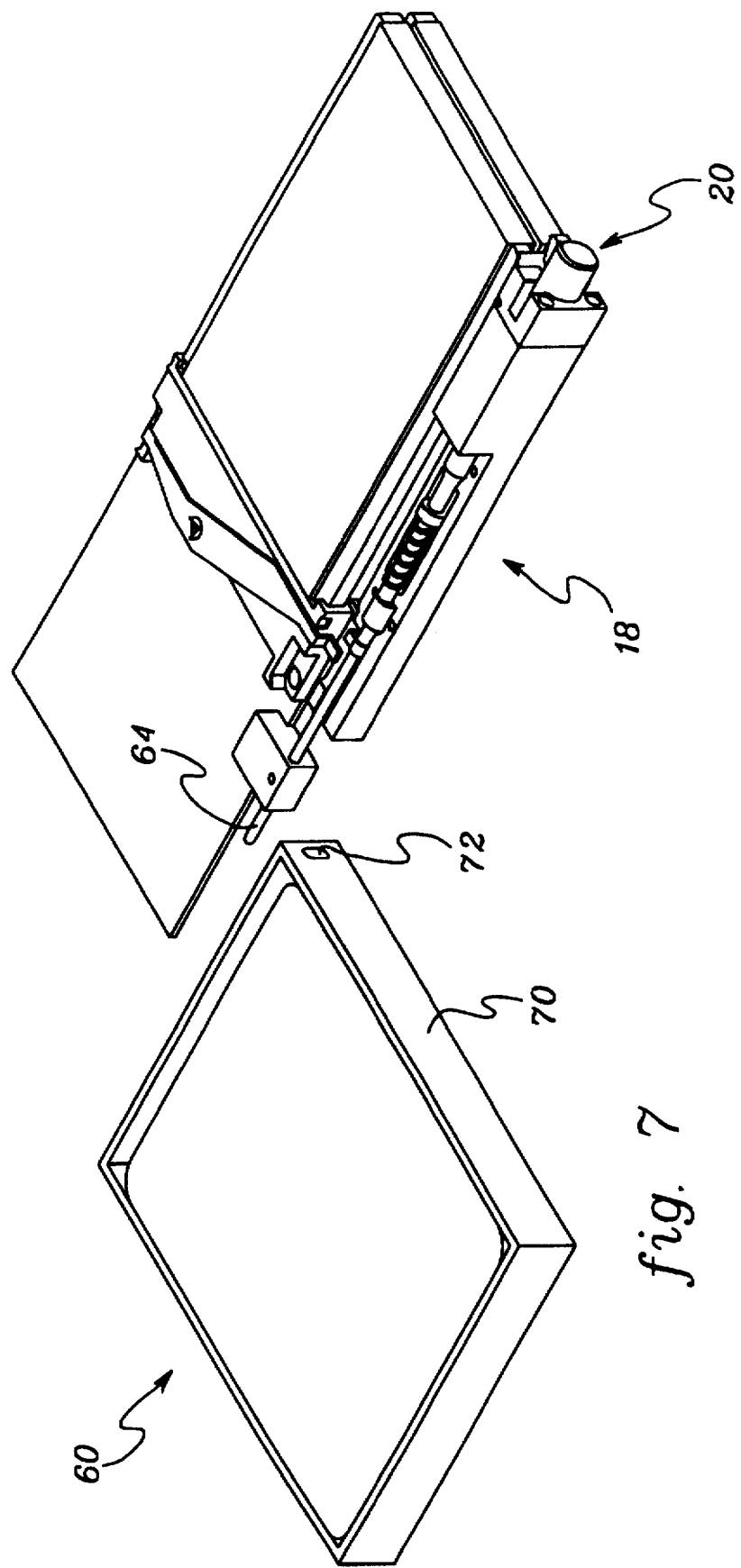
FIG. 7 depicts an alternate embodiment of the disk drive locking mechanism of FIG. 5.
Figure 8:
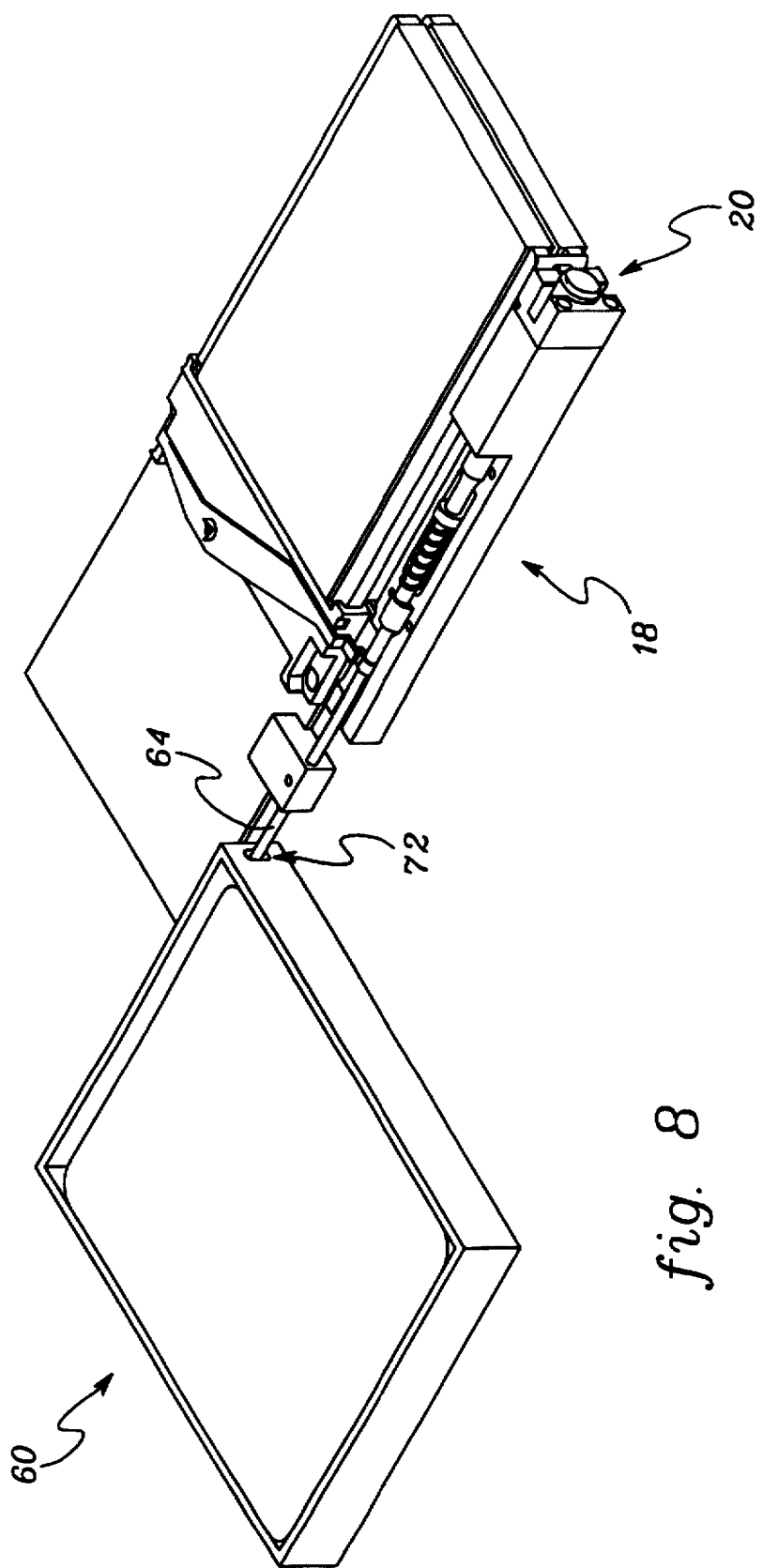
FIG. 8 depicts the apparatus of FIG. 7 in the locked position.

FIG. 7 depicts an alternate embodiment for the apparatus of FIG. 5, using less hardware and achieving the same result. In this embodiment, removable hard disk drive 60 is situated perpendicular to the ejection mechanism 18 such that ejection mechanism 18 can be used to hold same. Specifically, actuating pin 64 enters an opening 72 in disk drive chassis 70 when common selector 20 is in the parked position. In this way, disk drive 60 can be held (see FIG. 8), without requiring the holding means of FIG. 5.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

We claim:

1. Apparatus for selecting and ejecting a PC Card from a stack of PC Cards, the apparatus comprising;

a common selector for selecting a PC Card from the stack for ejection, wherein the common selector has at least one more selection position than a maximum number of possible PC Cards in the stack; and means coupled to the common selector for ejecting the selected PC Card.

2. The apparatus of claim 1 wherein the at least one more selection position comprises a parked position where the stack of PC Cards is held in place.

3. The apparatus of claim 2 further comprising means coupled to the common selector for holding the stack of PC Cards in place when the parked position is selected.

4. The apparatus of claim 3, wherein the holding means comprises a moveable flap adjacent the stack of PC Cards and responsive to the common selector.

5. The apparatus of claim 1 further comprising means for locking the apparatus such that the stack of PC Cards is locked in place.

6. The apparatus of claim 5 wherein the locking means comprises a mechanical locking means.

7. The apparatus of claim 5 wherein the locking means comprises an electrical locking means.

8. The apparatus of claim 7 wherein the electrical locking means comprises a solenoid.

9. The apparatus of claim 1 wherein the common selector comprises a rotatable spring-loaded knob capable of an inward position and an outward position.

10. The apparatus of claim 9, further comprising a housing for the ejecting means and rotatable spring-loaded knob, wherein the rotatable spring-loaded knob includes a radial extension and is rotatable when in the outward position, and wherein the housing includes a plurality of slots for accepting the radial extension when the rotatable spring-loaded knob is in the inward position.

11. The apparatus of claim 1, wherein the ejecting means comprises mechanical means for ejecting the selected PC Card.

12. The apparatus of claim 11, wherein the mechanical ejecting means comprises:

a spring-loaded shaft coupled at a first end to the common selector and including a radial extension at a second end opposite the first end; and a pivoting actuator arm responsive to the radial extension for ejecting the selected PC Card.

13. The apparatus of claim 1, further comprising a removable hard disk drive and means cooperating with the ejecting means for holding the removable hard disk drive in place.

14. The apparatus of claim 13, wherein the holding means comprises a spring-loaded latch actuated by the ejecting means.

15. The apparatus of claim 1, further comprising a removable hard disk drive, wherein the ejecting means holds the removable hard disk drive according to the common selector.

16. The apparatus of claim 1, further comprising a removable hard disk drive and means for locking the ejecting means such that the stack of PC Cards and the removable hard disk drive are locked in place.

17. The apparatus of claim 1 wherein the common selector is sized to facilitate manual manipulation thereof.

* * * * *